United States Patent
Kobylkin et al.

(10) Patent No.: US 9,805,362 B2
(45) Date of Patent: Oct. 31, 2017

(54) MOBILE DEVICES FOR ACTIVATING INSTANT DISPOSABLE PAYMENT CARDS

(71) Applicant: PAYPAL, INC., San Jose, CA (US)

(72) Inventors: Egor Kobylkin, Berlin (DE); Robin Schuil, Almere (NL)

(73) Assignee: PAYPAL, INC., San Jose, CA (US)

(*) Notice: Subject to any disclaimer, the term of this patent is extended or adjusted under 35 U.S.C. 154(b) by 0 days.

(21) Appl. No.: 15/076,618

(22) Filed: Mar. 21, 2016

(65) Prior Publication Data
US 2016/0203474 A1 Jul. 14, 2016

Related U.S. Application Data

(63) Continuation of application No. 13/725,492, filed on Dec. 21, 2012, now abandoned.

(60) Provisional application No. 61/579,469, filed on Dec. 22, 2011.

(51) Int. Cl.
| G06Q 20/10 | (2012.01) |
| G06Q 20/34 | (2012.01) |
| G06Q 20/32 | (2012.01) |
| G07F 7/08  | (2006.01) |

(52) U.S. Cl.
CPC ....... *G06Q 20/354* (2013.01); *G06Q 20/3224* (2013.01); *G06Q 20/348* (2013.01); *G07F 7/086* (2013.01)

(58) Field of Classification Search
CPC .............................. G06Q 20/354; G06Q 20/10
USPC .......................................................... 705/39
See application file for complete search history.

(56) References Cited

U.S. PATENT DOCUMENTS

| 8,050,997 B1 | 11/2011 | Nosek et al. |
| 2003/0028481 A1 | 2/2003 | Flitcroft et al. |
| 2004/0230536 A1 | 11/2004 | Fung et al. |
| 2009/0327135 A1* | 12/2009 | Nguyen ............... G06Q 20/40 705/44 |
| 2012/0085829 A1 | 4/2012 | Ziegler |
| 2012/0271732 A1 | 10/2012 | Glass et al. |
| 2014/0188638 A1* | 7/2014 | Jones ............... H04M 1/72569 705/16 |

* cited by examiner

*Primary Examiner* — Lindsay M Maguire
(74) *Attorney, Agent, or Firm* — Haynes and Boone, LLP

(57) ABSTRACT

An instant disposable payment card can have a quick response (QR) code. The QR code can be scanned by the user. Scanning the QR code can facilitate activation and/or funding of the instant disposable payment card and/or can facilitate a creation of an account or an activation of a pre-created account at a payment system provider. The user can then use the instant payment card to pay for purchases. A merchant can scan the QR code or swipe a magnetic strip of the instant disposable payment card to effect payment to the merchant for the purchase. An account of the instant disposable payment card can be funded after use thereof to make a purchase.

20 Claims, 5 Drawing Sheets

MOBILE DEVICES FOR ACTIVATING INSTANT DISPOSABLE PAYMENT CARDS

PRIORITY CLAIM

This application is a continuation of U.S. patent application Ser. No. 13/725,492, filed Dec. 21, 2012, which claims the benefit of the priority date of U.S. Provisional Patent Application No. 61/579,469, filed on Dec. 22, 2011 and pursuant to 35 USC 119. The above applications are incorporated by referenced herein in their entirety.

BACKGROUND

Technical Field

The present disclosure generally relates to electronic commerce and, more particularly, relates to methods and systems for providing an instant disposable payment card.

Related Art

Payment cards are well known and widely used. Examples of payment cards include credit cards, bank cards, debit cards, and gift cards. Such payment cards are commonly used in place of cash and checks to make purchases. Generally, such payment cards provide a safer and more convenient method for making payments as compared to the use of cash and checks. Thus, consumers are generally more comfortable carrying payment cards than they are carrying cash or checks.

However, payment cards have some important deficiencies. Payment cards are not as safe as desired. For example, a payment card or a payment card number can be stolen, thus potentially providing a thief with access to the legitimate cardholder's purchasing power and possibly providing the thief with access to an account, such as a bank account of the cardholder.

DETAILED DESCRIPTION

Figure 1:
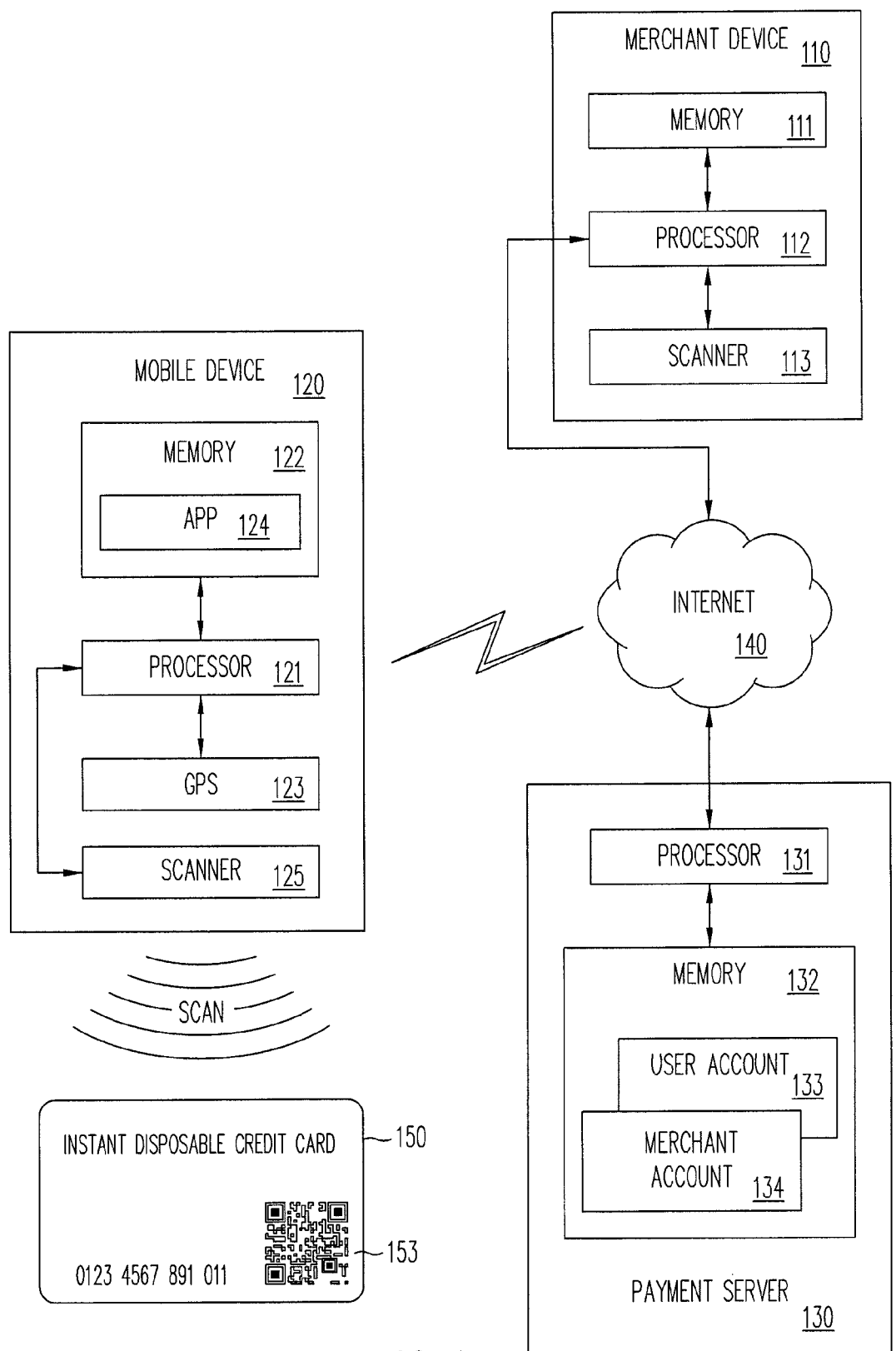
FIG. 1 is a block diagram of a system for providing and using instant disposable payment cards, according to an embodiment.

Methods and systems can provide an instant disposable payment card. According to an embodiment, the instant disposable payment card can have a quick response (QR) code, any other type of code, or any combination of types of codes formed thereon or associated therewith. The code can be scanned or otherwise read by the user, such as with a smart phone or other device. Scanning the code can facilitate activation of the instant disposable payment card. Funding of the instant disposable payment card can be done by the user or can be done automatically, such as during or after the activation process. Funding of the instant disposable payment card can be done prior to a purchase with the instant disposable payment card or after the purchase with the instant disposable payment card.

Funding of the instant disposable payment card after the purchase can tend to minimize the amount of money in an account of the instant disposable payment card. Thus, funding of the instant disposable payment card after the purchase can tend to minimize the user's exposure to risk with respect to the account. If the instant disposable payment card is lost or stolen, there can be little or no money in the account for improper use by others.

Funding of the instant disposable payment card after the purchase can also tend to provide more efficient or more desirable use of the user's money. The user can prefer to keep the user's money in another account, such as a checking account or a debit card account, until it is necessary to transfer the money to the account of the instant disposable payment card. Funding can be done as needed and can be performed automatically by the system, either with or without the need for user confirmation of money transfers.

The instant disposable payment card can have a magnetic strip. The magnetic strip can contain the code. A merchant can scan the code to facilitate payment for the purchase. For example, the merchant can scan the QR code or swipe a magnetic strip of the payment card to facilitate payment for the purchase.

According to an embodiment, merchants can obtain new customers for a payment provider or the like. The new customers can be obtained off line, e.g., without substantial involvement of the payment provider. In this manner, the cost of obtaining new customers can be reduced while increasing the number of new customers obtained. Thus, the system can provide a low cost method for marketing services of the payment provider.

According to an embodiment, the instant disposable payment card can be a substantially blank card. For example, the instant disposable payment card can have only a QR code or the like thereon. The instant disposable payment card can lack any information, such as the user's name, thereon.

A company name and/or logo of the provider of the instant disposable payment card can be printed on the instant disposable payment card. The instant disposable payment card can have any desired information printed or otherwise formed thereon. Such information can be put on the instant disposable payment card by the user, the merchant, or any other entity. The user's name can be put on the instant disposable payment card.

An unactivated instant disposable payment card can be associated with or connected to a pre-created payment provider account, such as an account of PayPal, Inc. Thus, a plurality of unactivated instant disposable payment cards can be created and a generally corresponding plurality of pre-created payment provider accounts can be created. Each of the unactivated instant disposable payment cards can be associated with one of the pre-created payment provider accounts, such as via an account number and/or the QR code. The account number can be the QR code or can be part of the QR code or visa-versa. The instant disposable payment cards can be activated instantly (such as at the merchant's store with a smart-phone (QR code) or via a browser.

In this manner, prospective users or customers (such as prospective customers of the payment provider and/or prospective customers of the merchant) can be provided with a tangible object, e.g., the instant disposable payment card. The tangible object can be connected to the payment provider prior to the users opening an account with the payment provider.

Providing a prospective customer, e.g., the user, with the instant disposable payment card can encourage the prospective customer to use the instant disposable payment card and to later become a regular customer of the payment provider and/or merchant. Once activated, the instant disposable payment card can use an automated payment clearing system such as the Instant Automated Clearing House (iACH) and/or an invoice payment system such as BillSafe to process payments resulting from purchases made with the instant disposable payment card. By combining the instant disposable payment card with an invoice payment system, such as BillSafe, customers are further encouraged to use the system.

The cost to the payment provider can be very low. For example, the cost of providing the instant disposable payment cards and for using the instant disposable payment cards can be low enough to provide an attractive mechanism for marketing of the payment provider. By creating and providing accounts and card with no funds associated therewith (until the user funds the account), the cost associated therewith can tend to be minimized. The instant disposable payment cards can be printed inexpensively and can be distributed as merchandise or along with the merchandise.

For example, the payment provider can issue a plurality of blank cards having a QR codes printed thereon. Each instant disposable payment card can have a magnet strip, a QR code, a bar code, an SKU code, a RFID code, and/or any other code. The code can be printed on the card, attached to the card (such as via a label or sticker), or otherwise formed upon and/or within the card. The user or any other person (such as the merchant) can scan the QR code with a smartphone and can fill in a linked form (such as on a website of the payment provider or the merchant) to open, activate, and/or fund an account associated with the instant disposable payment card. The unactivated instant disposable payment card can thus be automatically associated with the new account. The new account can be a pre-existing account.

After adding a bank account, credit card account, or the like to the payment provider account/instant disposable payment card account, then the instant disposable card can be funded with money. The instant disposable payment card can then be used as a point of sale (POS) debit or credit card.

Where available, payment on invoice (BillSafe) can be used. Using BillSafe allows the user to make payment, e.g., transfer funds to the instant disposable payment card account, upon receiving a bill or invoice. Using BillSafe allows the user to complete the purchase and initiate an invoicing process by the merchant, thereby deferring the actual funds transfer. The actual payment (funds transfer) takes place after the receipt of the invoice and before the payment due date.

A credit can be given to the customer immediately upon registration. In this manner, the user can make low risk purchases, such as purchases for digital goods and/or purchases for small amounts. The credit can be for a small money amount. For example, the credit can be for $5, $10, or $25. The credit can be restricted, such as for use when purchasing one or more specified products. The credit can be for a larger amount. The credit can be for any amount.

Thus, prospective customers can be provided with a tangible object, e.g., the instant disposable payment card, that is connected to the payment provider (the payment provider can own or operate the system) before the prospective customers open an account with the payment provider. Once the prospective customer opens an account, instant disposable payment card can remain in use by the user. Thus, the instant disposable payment card can be an effective marketing tool for the payment provider.

Note that use of the payment provider herein can be by way of example only and not by way of limitation. The instant disposable payment card system can be owned or operated by the payment provider or by any other entity.

The instant disposable payment card can remain in the possession of the user and thus encourage further user thereof. The instant disposable payment card can stay with the user and thereby encourage higher customer engagement with the payment provider. The instant disposable payment card can remind the customer about the payment provider account (such as via a URL, account ID, payment provider name or logo or any other information printed or otherwise provided on the instant disposable payment card). Moreover, the instant disposable payment card can be useful, convenient, and comparatively safe payment means. For example, by paying into the instant disposable payment card account via a POS debit card, use of the instant disposable payment card can be made easy and convenient while substantially limiting exposure of the user's money to theft and fraud.

According to an embodiment, the instant disposable payment card can include a QR code and/or a magnetic stripe that associates the instant disposable payment card with the user's payment provider account. For example, the QR code and the magnetic stripe can associate the instant disposable payment card with the account for the instant disposable payment card and the account for the instant disposable payment card can be associated with the user's payment provider account. Thus, product purchased with the instant disposable payment card can readily be paid for via the payment provider account (via the instant disposable payment card account).

The user can activate or fund the instant disposable payment card by scanning the QR code, such as with the user's smart phone, which connects the user to the user's account with the payment provider. The user can activate or fund the instant disposable payment card by scanning the QR code, such as with the user's smart phone, which connects the user to the payment provider web site or initiates a phone call where the user can either request the creation of a payment provider customer account or connect an existing payment provider customer account to the card account. The card account number is encoded in the QR code and transferred to the payment provider over the communication link (URL encoded or tone dialing code). The activation can take place completely manually via typing in or reading out over the phone.

The user can enter a desired amount to fund the card. The user can then use the card to make payments, such as by a merchant scanning the QR code or by swiping the card to read the magnetic stripe. The instant disposable payment card can be a disposable card printed on paper or any other material.

For example, the instant disposable payment card can resemble a subway ticket. The card can also be the subway ticket or any other card or ticket. The QR code can be printed on the subway ticket in addition to the magnet stripe or QR code that serves for subway fare system.

The instant disposable payment card can be funded, used, and re-funded, as desired. The instant disposable payment card can be discarded when no longer used or desired by the user.

According to an embodiment, the instant disposable payment card can include a QR code. The user can scan the QR code to load the instant disposable payment card with a certain or predetermined amount of funds. The same merchant who provided the instant disposable payment card or a different merchant can subsequently scan the QR code to accept payment from the user for goods or services provided by the same merchant or the different merchant.

The instant disposable payment card can be funded only as needed. For example, the instant disposable payment card can be funded from a bank account, credit card, payment provider account, or in any other manner for each use of the instant disposable payment card and only after the user. Thus, a user can control or limit exposure to a funding card, while easily being able to fund or add funds to the card.

The instant disposable payment card can be funded with any desired amount at any desired time. Thus, the instant disposable payment card can be funded with any desired amount prior to use.

According to an embodiment, the user can be provided with the instant disposable payment card having at least a QR code printed on it. The instant disposable payment card can be provided by a merchant, a payment provider, or the user can print the instant disposable payment card (such as via a home or office printer). The QR code can contain information about a merchant, a user, a user account, a payment provider, a code or card identifier, or any other information.

The user can scan the QR code, such as from the user's smart phone. The user's smart phone can open an app or web page, such as with the payment provider. The user can then log in to the user's payment provider account, such as by entering requested information like a user name, phone number, password, and/or a personal identification number (PIN). Once the user is logged in, the user can enter or select a desired amount for funding the instant disposable payment card. For example, the user can fund the card with $50.

The user can also place limits or restrictions on the card as desired. For example, the user can place limits on the instant disposable payment card regarding when the card can be used, an expiration date/time of the card, the product or type of product that can be purchased, any other users who are permitted to use the etc. Once funded, the payment provider associates the QR code and/or card with the user's account and the funding amount. The card is then ready for use by the user. In one embodiment, the card is authorized for a certain amount, but the funds are not withdrawn or debited from the user's account until the card is used. In another embodiment, the funds are debited when the card is loaded.

For example, upon entering a club, the user or customer receive a paper card (similar to a business card) which has a unique QR code printed on it. The QR code stores information about a disposable account that can be used to pay for drinks and other items from the club. The customer scans the QR code with their phone and authorizes a certain amount of money to be placed on the card. The customer then walks over to the bar, orders drinks, and simply presents the paper card to the bartender. The bartender scans the QR code at the cash register. This communicates information to the payment provider to process to payment request from the bartender. For example, the scan can communicate information about the club, such as an account or identifier, and the card/QR code. The payment provider determines whether there are funds available associated with the QR code, and if so, whether the payment request can be made, such as based on the amount of the payment request, the amount of funds on the card, the location of the merchant, etc. If approved, the payment provider credits an account of the merchant and reduces the account of the consumer accordingly. Thus, the next time the card is used, there will be a lower amount available. A receipt of the transaction can automatically be placed in the user's account.

Use of the instant disposable payment card system provides various benefits. For example, the system can allow multiple people to authorize sums of money to the same card. This way, the user and the user's friends can each add some amount to the card and have any desired person make purchases with the single card. As a further example, if the user loses the card, the user can access the user's payment provider account to revoke the authorization on the card, thereby eliminating the possibility that others who find the card can use the card.

As a further example, if there are insufficient funds on the card to pay for a purchase, the user can simply scan the card at the bar or anywhere else to fund the card with additional funds. As a further example, the user can hand the card to anyone, such as a friend, to make a purchase, such as at the bar. The user does not need to give him any user credentials to use the card.

As a further example, the card can be made compatible with non-payment provider users. For example, the club owner can install a self-service payment terminal that allows customers to scan their card and load money on it using cash or their credit card. As a further example, if the user is traveling or abroad, the user can charge the card using the payment provider account and pay in the user's home country currency.

As a further example, if the user needs a receipt (e.g., for reimbursement), the receipt can already be available in the user's account or phone, as the payment provider can automatically load or place a receipt after a purchase. The user can also scan the QR code and download the receipt to the user's phone. As a further example, after use the user can simply destroy the card. If the card was pre-funded, the user can also transfer any remaining amount back to the user's payment provider account.

In another embodiment, a user is provided the instant disposable payment card with at least a QR code and a magnetic stripe printed on it. The magnetic stripe can be associated or correlated with the QR code on the card. The card can be provided by a merchant, a payment provider, or the user can print the card. The QR code can contain information about a merchant, a user, a user account, a payment provider, a code, stripe, or card identifier, or other desired information. The user then scans the QR code, such as from the user's smart phone, which opens up an app or page with the payment provider. The user can then login to the user's account, such as by entering requested information like a user name, phone number, password, and/or PIN. Once logged in, the user can enter or select a desired amount to fund the card with. For example, the user can fund the card with $50.

The user can also place limits or restrictions on the instant disposable payment card as desired, such as when the card can be used, an expiration date/time of the instant disposable payment card, etc. Once funded, the payment provider can associate the QR code, stripe, and/or card with the user's payment provider account to provide funding of the instant disposable payment card. The instant disposable payment card is then ready for use magnetic by the user. In one embodiment, the instant disposable payment card is authorized for a certain amount, but the funds are not withdrawn or debited from the user's account until the card is used. In another embodiment, the funds are debited when the instant disposable payment card is loaded.

In one example, the user has the instant disposable payment card swiped by a merchant to read information contained in the magnetic stripe. The merchant or the user can swipe the instant disposable payment card at a POS device, which communicates certain information contained in the instant disposable payment card as well as information about the transaction to the payment provider. For example, the payment provider can receive a merchant identifier, a payment request amount, and a card number or identifier. Using this information, the payment provider accesses the user account associated with the instant disposable payment card to determine limits for the instant disposable payment card and/or restrictions. The payment request can be processed.

If the payment is approved, the merchant can be notified, the payment amount credited to a merchant account, and a corresponding amount debited from the user's account. The payment provider then updates the instant disposable payment card account with a reduced amount left for use. The user can add or deduct funds at any time by scanning the QR code on the instant disposable payment card. The user can also manage the instant disposable payment card directly through the user's account with the payment provider, such as by logging into the user's account through a PC or other device. Note that the instant disposable payment card can also be used as in the first embodiment, where the QR code is scanned by the merchant or payee. Thus, advantages and features are the same or similar to the first embodiment. In addition, the instant disposable payment card with a magnetic stripe can allow the user to make payments where the merchant does not have a QR code scanner and only has a magnetic strip reader.

Note that in other embodiments, an NFC chip can be added to the instant disposable payment card, with or without the magnetic stripe. Processing and use would be similar to what is described herein. In particular, the QR code can be used to load the instant disposable payment card, such that when the instant disposable payment card is read by an NFC reader at the POS, the instant disposable payment card can be used to make a payment through the account with the payment provider associated with the instant disposable payment card. The user can also be able to load the instant disposable payment card using the NFC chip if the user's device has an NFC reader.

Thus, according to an embodiment, the instant disposable payment instant disposable payment card can store a code, e.g., a number, that is available to both the user and the merchant so that the instant disposable payment card can be loaded or preauthorized and used to make payments at POS locations, where the code can be used to associate the instant disposable payment card with an account of the user with a payment provider.

Instant disposable payment cards containing QR codes (and magnetic strips in some cases) can offer users an alternative form of payment that provides several advantages over traditional method means. The instant disposable payment cards can be disposable and easily made, so that the user can have several disposable paper cards in the user's possession at any one time. However, the instant disposable payment cards would have no value to anyone unless and when the user funds the instant disposable payment cards. Funding the instant disposable payment cards can be easily accomplished anywhere by the user scanning the QR code with a user smart phone and funding the instant disposable payment card through the user's account with a payment provider. Thus, these instant disposable payment cards provide a safe way for the user to make payments, while limiting exposure that a credit or debit card can have.

According to an embodiment, a method can comprise receiving a payment request from a merchant through a merchant device. The payment request can be received via a scan of a QR code on the instant disposable payment card. The method can further comprise accessing an account of the user with a payment provider based on the payment request, determining a funding limit associated with the instant disposable payment card, determining whether an amount of the payment request is within the funding limit of the instant disposable payment card, and processing the payment request.

The instant disposable payment card can be a disposable paper card. The instant disposable payment card can be provided to the user by the merchant. The instant disposable payment card is provided to the user by the payment provider. The processing can comprise crediting an account of the merchant, debiting the account of the user, and notifying the merchant if the payment request is approved.

The processing can further comprise reducing the funding limit of the instant disposable payment card based on the amount of the payment request. The instant disposable payment card can be activated when the user scans the QR code and funds the instant disposable payment card through the account of the user with the payment provider. The method can further comprise increasing the funding limit when the user adds more funds to the instant disposable payment card by scanning the QR code and accessing the account of the user with the payment provider.

According to an embodiment, a method can comprise receiving a payment request from a merchant through a merchant device. The payment request can be received from a swipe of a magnetic strip on the instant disposable payment card also having a QR code. An account of the user with a payment provider can be accessed based on the payment request. A funding limit associated with the instant disposable payment card can be determined. Whether an amount of the payment request is within the funding limit of the instant disposable payment card can be determined. The payment request can be processed.

The instant disposable payment card can be a disposable paper card. The instant disposable payment card can be provided to the user by the merchant. The instant disposable payment card can be provided to the user by the payment provider.

The processing can comprise crediting an account of the merchant, debiting the account of the user, and notifying the merchant if the payment request is approved. The processing can further comprise reducing the funding limit of the instant disposable payment card based on the amount of the payment request.

The instant disposable payment card can be activated when the user scans the QR code and funds the instant disposable payment card through the account of the user with the payment provider. The method can further comprise increasing the funding limit when the user adds more funds to the instant disposable payment card by scanning the QR code and accessing the account of the user with the payment provider.

According to an embodiment, a disposable funding instant disposable payment card can comprise a QR code, wherein the QR code is configured to be scanned by a payee to send a payment request to a payment provider, who processes the payment request by accessing an account of the user associated with the instant disposable payment card, determining a funding limit of the instant disposable payment card, and determining whether the payment request is within the funding limit of the instant disposable payment card. The instant disposable payment card can be activated when the user scans the QR code and funds the instant disposable payment card through the account of the user with the payment provider.

The instant disposable payment card can further comprise a magnetic stripe, wherein the magnetic stripe is configured to be read by a payee to send a payment request to the payment provider, who processes the payment request by accessing the account of the user associated with the instant disposable payment card, determining a funding limit of the instant disposable payment card, and determining whether the payment request is within the funding limit of the instant disposable payment card.

According to an embodiment, a system can comprise one or more memories for storing account information for a plurality of pre-created instant disposable payment card accounts. The account information can include a code for each account. One or more processors can be operable to receive a communication including an indication of a desire of a user to activate an instant disposable payment card associated with one of the accounts. The processor(s) can be further operable to activate the instant disposable payment card and send a communication to a device of the user including an indication that the instant disposable payment card has been activated.

The received communication can include identification information for the user. The received communication can include a request to transfer money, such a via a credit card or payment provider or such as from a back account, to fund the account. The received communication can include a request for credit to be provided for the account. The received communication can include information regarding the user, such as the user's name, social security number, home address, telephone number, employer, years of employment, email address, and the like. The received communication can include any desired information or request.

The account can be unfunded. The communication to the device of the user can further include a message informing the user that the account needs to be funded. The user can then fund the account. For example, the user can fund the account via a credit card, via a payment provider, by check, from a bank account, by depositing funds with the merchant, or by any other means.

The one or more processors can be operable to fund the account with a money amount. Such funding with money can be up front or prior to any use of the instant disposable payment card. The account can be funded after requesting authorization from the user. The one or more processors can be operable to automatically fund the account via a credit card, bank account, or the payment provider. Thus, the user can provide the system with information regarding the user's credit card, bank account, or payment provider and the system can use this information to automatically fund the account. In this manner, the user is spared the inconvenience of having to fund the account. The communication to the device of the user can further include a message informing the user that the account is funded with the money amount. In this manner, the account can be funded with money, as opposed to being provided with credit. For example, the account can be funded with $100 of money.

The one or more processors can be operable to automatically provide the account with a credit amount. The credit amount can be provided either with or without authorization from the user. In this manner, the account can be provided with credit, as opposed to being funded with money. For example, the account can be provided with $100 of credit.

The account can both be provided with credit and funded with money. For example, the account can be provided with $100 of credit and funded with $100 of money. Thus, the user can make purchases with the money until the money amount is exhausted and can then make purchase with the credit. Any amount owed due to making purchases with the credit can be repaid immediately (such as during the following billing cycle) or can be repaid over time (such as via monthly installments).

The account can be funded with money on an as needed basis. For example, the account can funded with money from a credit card, payment provider, and/or bank account in response to a purchase transaction. Thus, the one or more processors can be further operable to fund the account with an amount of a purchase after the purchase is made. In this manner, the user's money can be transferred to the account only when needed.

The account can both be provided with credit and funded with money up front (such as when the account is opened and/or periodically thereafter), or provided with money on an as needed basis. Any desired combination of credit, up front funding, and as needed funding can be used.

The code can be a quick response (QR) code. The code can be a bar code, stock keeping unit (SKU), near field communication (NFC) code, or any other type of code. The code can be a human readable code, such as an alphanumeric code. The code can be read or scanned via a mobile device. For example, the code can be imaged (such as with a QR code, bar code, or SKU). As a further example, the code can be read wirelessly, such as with an NFC code. Thus, the code can be scanned from the instant disposable payment card. The code can include an identification of the instant disposable payment card, an account number, an identification of the merchant, information regard a payment provider (such as an identification of the payment provider and/or an account with the payment provider, such as an account associated with the instant disposable payment card), and any other information. The code can be used to facilitate opening of the account for the user. For example, the account number or identification of the instant disposable payment card can be or can include the account number of the account.

The code can be scanned from the instant disposable payment card via the user's mobile device. The code can be communicated to the one or more processors via the mobile device. The code can be communicated to the one or more processors from the mobile device via one or more networks. For example, the code can be communicated to the one or more processors from the mobile device via a local area network (LAN) of the merchant, the Internet, a cellular telephone data network, and/or any other network.

The code can be entered via a website of the system. For example, the code can be scanned with the user's mobile device and can be entered, either automatically or manually, into a form of the website. Alternatively, the code can be read by the user from the product, label, or other indicia and can be typed by the user into the form, such as via a keypad or touchscreen of the user device. If the human readable code is used, then it can be communicated to the payment provider staff or electronic customer service system via voice or any other means of communication available to humans.

The one or more processors can be further operable to process payments from the user via Instant Automated Clearing House (iACH). iACH is a type of an Electronic Funds Transfer (EFT). As used herein, iACH can include a pull bank funded transaction. In Germany iACH is referred to as Electronic Lastschrift Verfaren (ELV).

The one or more processors can be further operable to process payments from the user via invoice funding. For example, the one or more processors can be further operable to process purchases from the user via. BillSafe. BillSafe is a system that provides a purchase-on-invoice feature for the purchase of products, such as purchases made via a credit card or payment provider. Using BillSafe, a user can purchase and receive a product. Then, the user can be billed for the product, such as on an invoice, at a later time.

The one or more processors can be further operable to receive a communication including an indication of a money amount with which the account is to be funded. Thus, the user can indicate how much money is to be transferred to the account. For example, the use can specify a credit card, bank account, or payment provider which is to be used to fund the account. Similarly, the one or more processors can be further operable to receive a communication including an indication of a credit amount with which the account is to be provided. The account can be funded with a combination of money and credit.

The one or more processors can be further operable to send a communication to a device of the user including the code. Thus, the device of the user can subsequently be used to facilitate purchases via the instant disposable payment card.

The one or more processors can be further operable to send a communication to a device of the merchant including the code. Thus, the device of the merchant can subsequently be used to facilitate purchases via the instant disposable payment card.

The code can be a QR code. The QR code can contain information. For example, the QR code can contain information regarding at least one item such as information regarding the merchant, information regarding the user, information regarding a user account, and/or information regarding a payment provider. The QR code can contain any desired information.

According to an embodiment, a method can comprise storing, in one or more memories, account information for a plurality of pre-created instant disposable payment card accounts. The account information can include a code for each account. The method can further comprise receiving, electronically via one or more processors, a communication including an indication of a desire of a user to activate an instant disposable payment card associated with one of the accounts. The method can further comprise activating, electronically via the one or more processors or by any other means, the instant disposable payment card and sending, electronically via the one or more processors or by any other means, a communication to a device of the user including an indication that the instant disposable payment card has been activated.

According to an embodiment, a computer program product can comprise a non-transitory computer readable medium having computer readable and executable code for instructing one or more processors to perform a method. The method can comprising storing account information for a plurality of pre-created instant disposable payment card accounts. The account information can include a code for each account. The method can further comprise receiving a communication including an indication of a desire of a user to activate an instant disposable payment card associated with one of the accounts. The method can further comprise activating the instant disposable payment card and sending a communication to a device of the user including an indication that the instant disposable payment card has been activated.

According to an embodiment, the instant disposable payment card 150 can be used to withdraw money from an automatic teller machine (ATM). According to an embodiment, the instant disposable payment card 150 cannot be used to withdraw money from an automatic teller machine (ATM). According to an embodiment, the instant disposable payment card 150 can be used to add money to another account, such as a bank account, a credit card account, or a payment processor account.

Figure 5:
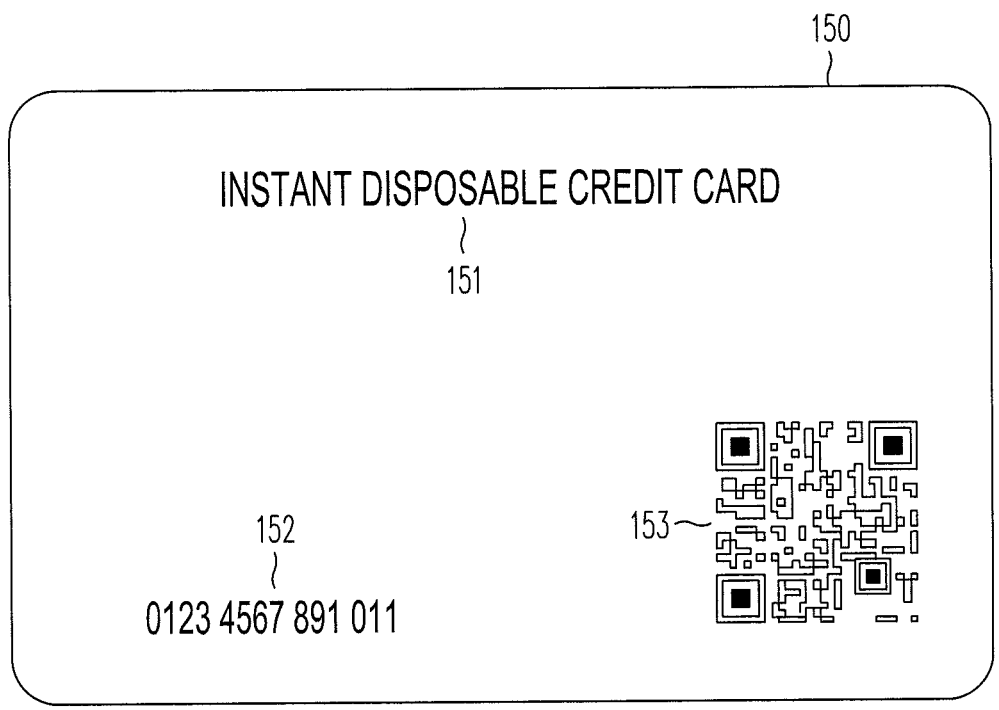
FIG. 5 shows an instant disposable payment card, according to an embodiment.

FIG. 1 is a block diagram of a system for providing and using an instant disposable payment card 150 (FIG. 5), according to an embodiment. The system can include a merchant device 110. The merchant device 110 can be a merchant checkout terminal, a mobile device, a computer, and/or a server, for example. The merchant device 110 can include a memory 111 and a processor 112. The merchant device 110 can be used for creating, storing, dispensing, authorizing, communicating information regarding, and/or using the instant disposable payment card 150. For example, the merchant device 110 can be used for making a purchase by the user with the instant disposable payment card 150.

The merchant device 110 can include a scanner 113. The scanner 113 can be a QR scanner, a bar code scanner, an SKU scanner, an NFC code scanner, an RFID code scanner, or any other type of scanner. The scanner 113 can be used to scan the code of the instant disposable payment card 150.

The system can include a mobile device 120. The mobile device 120 can be carried by the user. The mobile device 120 can be a cellular telephone, a smart telephone, a hand held computer, a laptop computer, a notebook computer, or a tablet computer, for example. The mobile device 120 can include a processor 121, a memory 122, and a global positioning system (GPS) 123.

The mobile device 120 can include a scanner 125. The scanner 125 can be a QR scanner, a bar code scanner, an SKU scanner, an NFC code scanner, an RFID code scanner, or any other type of scanner. The scanner 125 can be used to scan the code of the instant disposable payment card 150.

Thus, the instant disposable payment card 150 can be scanned by the mobile device 120. For example, a QR code 153 of the instant disposable payment card 150 can be scanned, read, stored in the memory 122, and/or communicated by the mobile device 120. The mobile device 120 can be used for routine telephone calls, text messaging, and web browsing, as well as for authorizing and/or using an instant disposable payment card 150.

The instant disposable payment card 150 can be a virtual payment card. For example, the instant disposable payment card 150 can be stored in the mobile device 120 or anywhere else. The mobile device 120 can display or otherwise provide the instant disposable payment card 150 or information regarding the instant disposable payment card 150, such as to facilitate a purchase therewith.

An app 124 can be stored in the memory 122 and executed by the processor 121. The app 124 can be used for activating and using the instant disposable payment card 150. The app 124 can be used to scan the QR code 153. For example, scanning the QR code 153 can automatically execute the app. The app can then ask the user to verify that the user wants to activate the instant disposable payment card 150. The app can then, if appropriate, present the user a form to fill out via the mobile device 120, such as via a key pad or touch screen thereof. Once activated, the app can facilitate use of the instant disposable payment card 150 to make purchases. Purchases can be made with the physical instant disposable payment card 150, the mobile device 120 (such as with a virtual instant disposable payment card and/or without the physical instant disposable payment card 150), or with a combination of the mobile device 120 and the instant disposable payment card 150.

The GPS 123 can be used to determine the location of the user. The GPS 123 can be used to determine the location of the user when the user attempts to activate and/or use the instant disposable payment card 150. Activation and/or use can be refused if the user is not at or near a predetermined location. For example, the user can be required to be at the location of the merchant where the unactivated instant disposable payment card was obtained in order to activate and/or use the instant disposable payment card 150.

The system can include a payment server 130. The payment server 130 can be a server of a payment provider, such as PayPal, Inc. The payment server 130 can be a single server or can be a plurality of servers. The payment server 130 can include one or more processors 131 and a memory 132. The memory 132 can be a memory of the payment server 130 or a memory that is associated with the payment server 130. The memory 132 can be a distributed memory. The memory 132 can store a user account 133 and a merchant account 134.

The payment server 130 can be used for facilitating authorization and use of the instant disposable payment card 150. For example, the payment server 130 can receive a communication from the mobile device 120 that is indicative of the QR code 153 of the instant disposable payment card 150 and can activate the instant disposable payment card 150 or can facilitate a purchase transaction in response to the communication.

Generally, the merchant device 110, the mobile device 120, and the payment server 130 can perform functions discussed herein. This is, to some extent, a function that is discussed herein as being performed via one of these devices can be performed by a different one of these devices or by a combination of these devices.

The merchant device 110, the mobile device 120, and the payment server 130 can communicate with one another via a network, such as the Internet 140. The merchant device 110, the mobile device 120, and the payment server 130 can communicate with one another via one or more networks, such as local area networks (LANs), wide area networks (WANs), cellular telephone networks, and the like. The merchant device 110, the mobile device 120, the social network 150, and the payment server 130 can communicate with one another, at least partially, via one or more near field communications (NFC) methods or other short range communications methods, such as infrared (IR), Bluetooth, WiFi, and WiMax.

FIG. 1 illustrates an exemplary embodiment of a network-based system for implementing one or more processes described herein. As shown, the network-based system can comprise or implement a plurality of servers and/or software components that operate to perform various methodologies in accordance with the described embodiments. Exemplary servers can include, for example, stand-alone and enterprise-class servers operating a server OS such as a MICROSOFT® OS, a UNIX® OS, a LINUX® OS, or another suitable server-based OS. It can be appreciated that the servers illustrated in FIG. 1 can be deployed in other ways and that the operations performed and/or the services provided by such servers can be combined or separated for a given implementation and can be performed by a greater number or fewer number of servers. One or more servers can be operated and/or maintained by the same or different entities.

Figure 2:
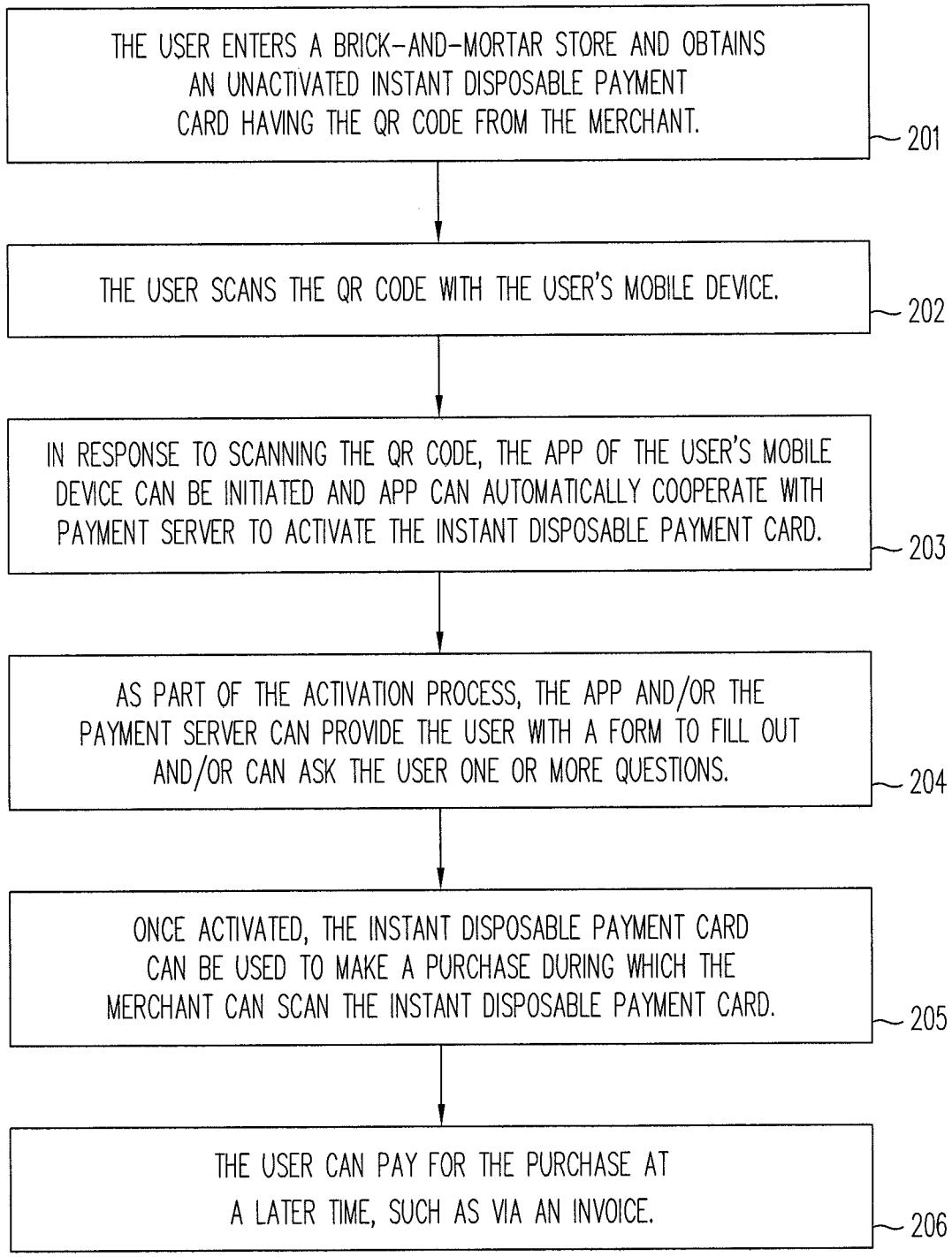
FIG. 2 is a flow chart showing a method for providing and using instant disposable payment cards, according to an embodiment.
Figure 3:
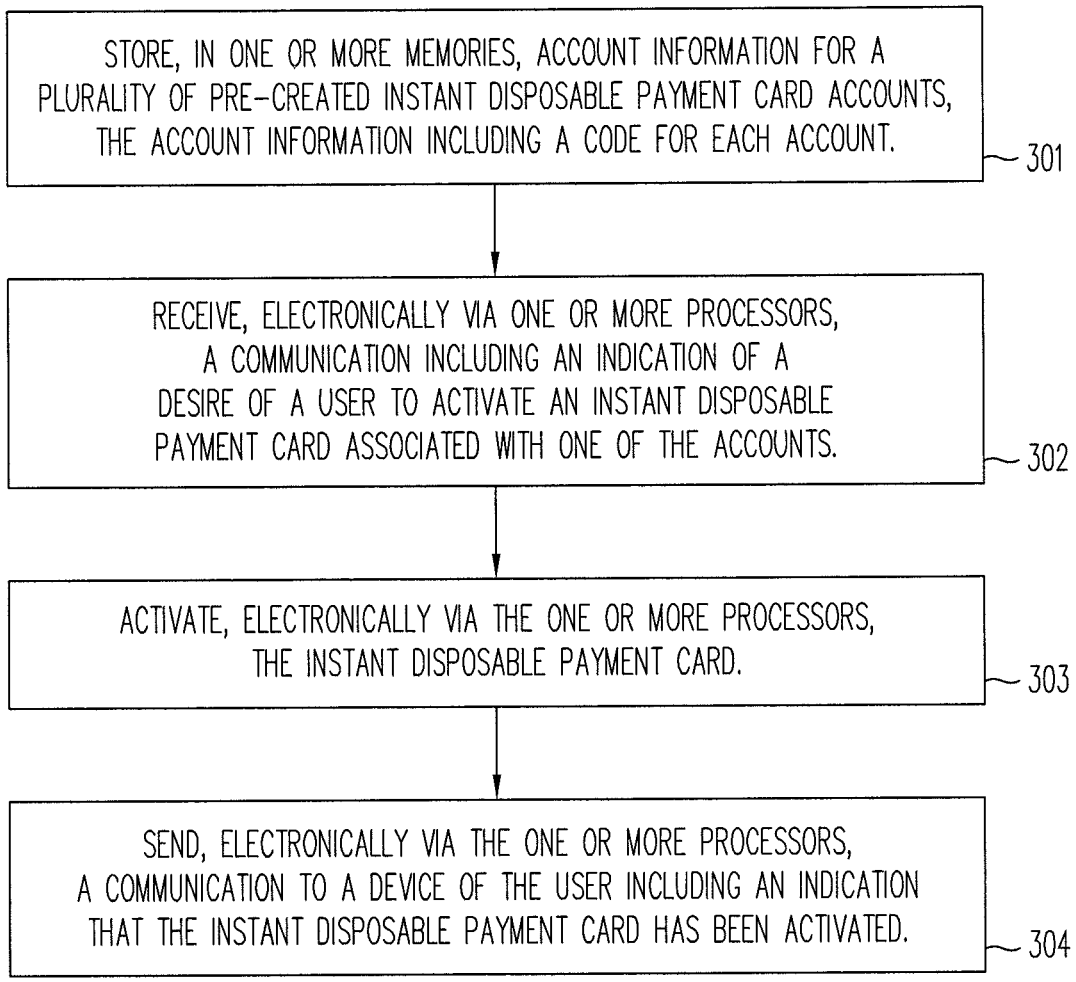
FIG. 3 is a flow chart showing further detail of the method for providing and using instant disposable payment cards, according to an embodiment.

FIGS. 2 and 3 are flow charts that describe examples of operation of the method for providing and using the instant disposable payment card 150, according to embodiments thereof. Note that one or more of the steps described herein can be combined, omitted, or performed in a different order, as desired or appropriate.

FIG. 2 is a flow chart showing a method for providing and using the instant disposable payment card 150, according to an embodiment. The user can enter a brick-and-mortar store and obtain an unactivated instant disposable payment card 150 having the QR code 153 from the merchant, as shown in step 201. The merchant can stock a quantity of unactivated instant disposable payment cards 150. The quantity of unactivated instant disposable payment cards 150 can be obtained from a bank, a credit card company, payment provider, payment card manufacturer, printer or anywhere else.

According to an embodiment, the instant disposable payment cards 150 cannot be used to make a purchase until activated. According to an embodiment, the instant disposable payment cards 150 can be used to make purchases prior to being activated. For example, according to an embodiment the instant disposable payment cards 150 can be used to make purchases of specified items, to take advantage of specified discounts or incentives, or to shop with a specified merchant prior to being activated.

The merchant can print the unactivated instant disposable payment card 150 for the user. The merchant can otherwise make the unactivated instant disposable payment card 150 for the user. For example, the merchant can be provided with an app or device that allows the merchant to print or otherwise make a limited number or an unlimited number of instant disposable payment cards 150 for distribution to users. The merchant can be provided with criteria for providing the instant disposable payment cards 150 to user. The merchant can be allowed to provide the instant disposable payment cards 150 to users at the merchant's discretion.

Thus, the unactivated instant disposable payment card 150 can be obtained from a merchant at a store. The unactivated instant disposable payment card 150 can be obtained via other means. For example, the unactivated instant disposable payment card 150 can be obtained from a person who is not a merchant, such as a friend or relative. The unactivated instant disposable payment card 150 can be received from a facility that is not a store, such as a health club, library, museum, or any other facility. The unactivated instant disposable payment card 150 can be received from any business or non-business entity. For example, the unactivated instant disposable payment card 150 can be received from an employer, church, club, or any other entity.

The unactivated instant disposable payment card 150 can be given as a gift. For example, the unactivated instant disposable payment card 150 can have some funds associated therewith, can provide discounts or incentives, or can have cash or other value.

The unactivated instant disposable payment card 150 can be received by taking possession of a physical instant disposable payment card 150, such as an instant disposable payment card 150 made of paper, paperboard, card stock, plastic, or any other material. The unactivated instant disposable payment card 150 can be received by mail, email, text message, by downloading (such as from a website) or any other means. Thus, the unactivated the unactivated instant disposable payment card 150 can be received as a virtual instant disposable payment card. The virtual instant disposable payment card can be printed as a virtual instant disposable payment card 150.

For example, a virtual instant disposable payment card 150 can be downloaded from a website of a payment provider or from a website of a merchant. The payment provider can be a payment provider that owns or operates the system. The merchant can be a merchant that participates in the system. The merchant and the payment provider can co-own and/or can cooperate in the operation of the system.

The user can scan the QR code 153 with the user's mobile device 120, as shown in step 202. The QR code 153 can be a unique code. Thus, each purchase can be readily associated with a particular instant disposable payment card 150 and therefore, at least to some degree, can be associated with one user and/or one account. Information represented by the QR code can be elsewhere on the instant disposable payment card 150. For example, such information can be printed on the instant disposable payment card 150, embodied in another type of code such as a bar code, an SKU, an NFC code, or an RFID code.

The QR code 153 can be a non-unique or duplicate code. That is, a plurality of instant disposable payment cards 150 can have the same code and thus each one of the plurality of instant disposable payment cards 150 can be substantially identical with respect to one another and can be associated with one account. Thus, each purchase can be associated with a particular group of instant disposable payment cards 150 and therefore, at least to some degree, can be associated with a particular group of users. For example, a business, club, or a church can want to provide members with such a plurality of instant disposable payment cards 150 that can be associated with one account.

In response to scanning the QR code, the app 124 of the user's mobile device 120 can be initiated and the app 124 can automatically cooperate with payment server 130 to activate the instant disposable payment card 150, as shown in step 203. An unactivated instant disposable payment card 150 is not authorized for use in purchase transactions and purchase transactions attempted with an unactivated instant disposable payment card 150 are typically not approved, such as by the payment server 130. An attempt to use unactivated instant disposable payment card 150 can prompt the merchant device 110 and/or the payment server 130 to initiate the activation process with the user who is attempting to use the unactivated instant disposable payment card 150. For example, the user can be presented with a form to fill out and/or can be asked if the user would like to have the unactivated instant disposable payment card 150 activated.

As part of the activation process, the app 124 and/or the payment server 130 can provide the user with the form to fill out and/or can ask the user one or more questions, as shown in step 204. The user can respond in the affirmative and/or can fill out the form to continue the activation process. Information from the form can be used by the payment server 130 to determine if the unactivated instant disposable payment card 150 is to be activated, e.g., if the user is credit worthy. This determination can be made in a manner analogous to the determination of whether credit is to be extended generally, such as via the use of a credit check.

Alternatively, the activation process can result in the unactivated instant disposable payment card 150 being activated without a determination of credit worthiness. For example, if the amount of credit to be extended is small, the risk of default is low (such as when the instant disposable payment card 150 is only to be used for discounts, rentals, deposits, or the like), the location where the instant disposable payment card 150 is to be used is low risk, or according to any other criteria, then the unactivated instant disposable payment card 150 can be activated without a determination of credit worthiness.

Once activated, the instant disposable payment card 150 can be used to make a purchase during which the merchant can scan the instant disposable payment card 150, as shown in step 205. The merchant can scan the instant disposable payment card 150 in a manner similar to the manner in which the user scanned the instant disposable payment card 150. For example, if the user scanned the instant disposable payment card 150 using the scanner 125 of the user device 120 to read the QR code 153, then the merchant can similarly scan the instant disposable payment card 150 by using the scanner 113 of the merchant device 110 to read the QR code 153.

The merchant can scan the instant disposable payment card 150 in a manner different with respect to the manner in which the user scanned the instant disposable payment card 150. For example, if the user scanned the instant disposable payment card 150 using the scanner 125 of the user device 120 to read the QR code 153, then the merchant can scan the instant disposable payment card 150 by using a bar code scanner, an SKU scanner, or an RFID the merchant device 110 to read a bar code, SKU, or RFID code of the instant disposable payment card 150. Thus, the instant disposable payment card 150 can contain a plurality of codes or types of codes that can be read or scanned in a plurality of different ways.

The user can pay for the purchase at a later time, such as via an invoice, as shown in step 206. For example, the user can pay using the BillSafe pay on invoice system. The user can pay for the purchase in any desired manner.

One or more limits can be placed on the use of the instant disposable payment card 150. For example, the instant disposable payment card 150 can be limited to use at the same merchant where the instant disposable payment card 150 was obtained and/or activated, can be limited to use at a specified time or times, can be limited to use at a specified location or locations, can be limited to use by a specified persons (such as the user) or persons (such as the user and others specified by the user), and/or for specified products (such as food, clothing, school books, car repair, and the like). The instant disposable payment card 150 can be limited to use with any combination of criteria.

Exceptions to limitation can be permitted. For example, a predetermined dollar amount of such exception can be permitted. Exception can require additional authorization, such as from a primary account holder. Exceptions can be permitted on predetermined day, at predetermined times, and/or for predetermined products.

FIG. 3 is a flow chart showing further detail of the method for providing and using the instant disposable payment card 150, according to an embodiment. The method can include storing, in one or more memories, account information for a plurality of pre-created instant disposable payment card accounts, the account information including a code for each account, as shown in step 301. The one or more memories can include the memory 111 of the merchant device 110, the memory 122 of the mobile device 120, the memory 132 of the payment server 130, and/or any other memory or memories.

The method can further include receiving, electronically via one or more processors, a communication including an indication of a desire of a user to activate an instant disposable payment card 150 associated with one of the accounts, as shown in step 302. The one or more processors can include the processor 112 of the merchant device 110, the processor 121 of the mobile device 120, the processor 131 of the payment server 130, and/or any other memory or memories.

The method can further include activating, electronically via the one or more processors, the instant disposable payment card 150, as shown in step 303. A communication can be sent, electronically via the one or more processors. The communication can be sent to a device of the user including an indication that the instant disposable payment card 150 has been activated, as shown in step 304.

In implementation of the various embodiments, embodiments of the invention can comprise a personal computing device, such as a personal computer, laptop, PDA, cellular phone or other personal computing or communication devices. The payment provider system can comprise a network computing device, such as a server or a plurality of servers, computers, or processors, combined to define a computer system or network to provide the payment services provided by a payment provider system.

In this regard, a computer system can include a bus or other communication mechanism for communicating information, which interconnects subsystems and components, such as a processing component (e.g., processor, microcontroller, digital signal processor (DSP), etc.), a system memory component (e.g., RAM), a static storage component (e.g., ROM), a disk drive component (e.g., magnetic or optical), a network interface component (e.g., modem or Ethernet card), a display component (e.g., CRT or LCD), an input component (e.g., keyboard or keypad), and/or cursor control component (e.g., mouse or trackball). In one embodiment, a disk drive component can comprise a database having one or more disk drive components.

The computer system can perform specific operations by processor and executing one or more sequences of one or more instructions contained in a system memory component. Such instructions can be read into the system memory component from another computer readable medium, such as static storage component or disk drive component. In other embodiments, hard-wired circuitry can be used in place of or in combination with software instructions to implement the invention.

Payment processing can be through known methods, such as transaction details being communicated to the payment provider through the app, the payment provider processing the details, which can include user account and identifier information and authentication, merchant information, and transaction details. The user account can be accessed to determine if any restrictions or limitations can prevent the transaction from being approved. If approved, the payment provider can send a notification to the merchant and/or the user.

Figure 4:
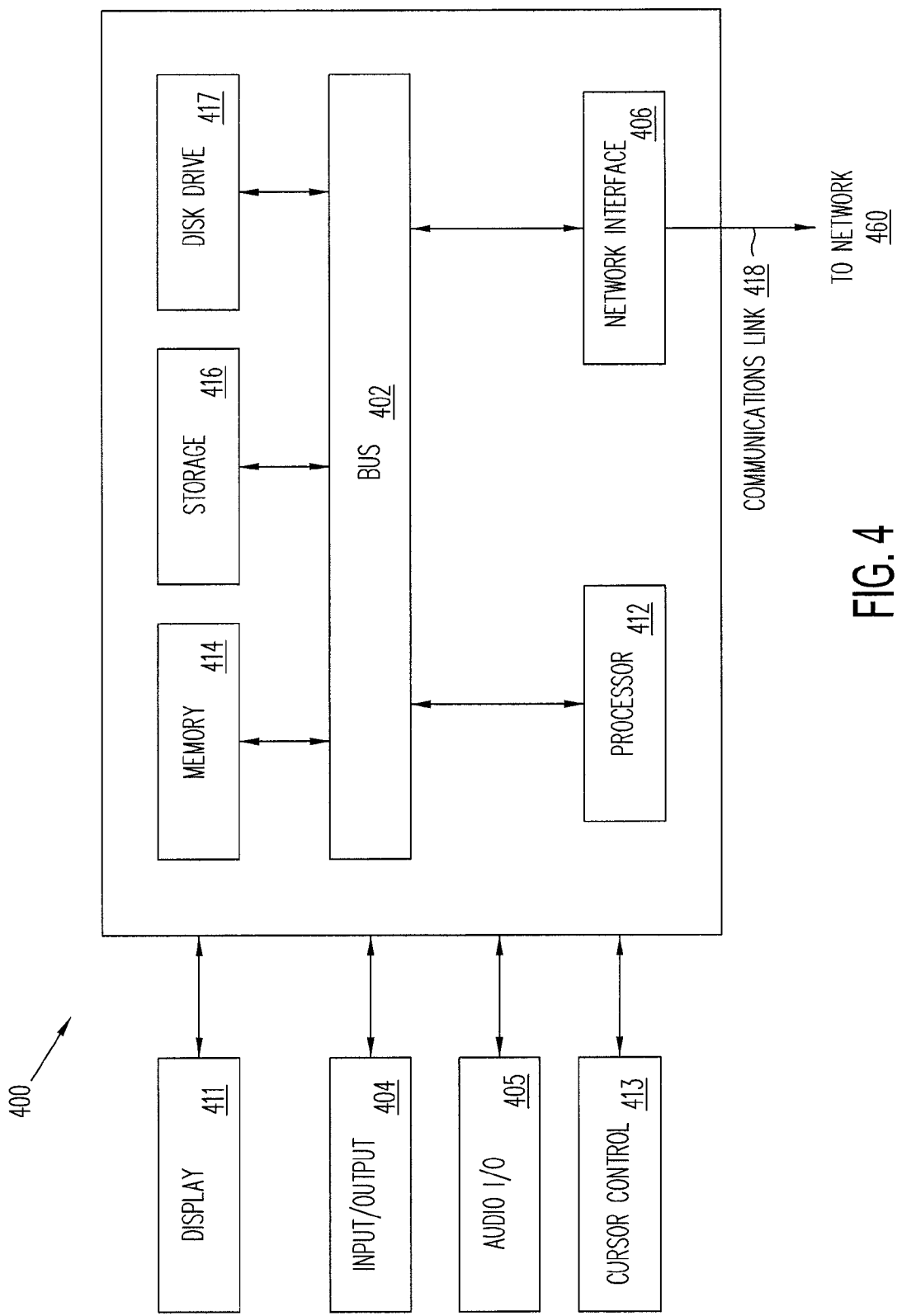
FIG. 4 is a block diagram of an example of a computer that is suitable for use in the system for providing and using instant disposable payment cards, according to an embodiment.

FIG. 4 is a block diagram of a computer system 400 suitable for implementing one or more embodiments of the present disclosure. In various implementations, the PIN pad and/or merchant terminal can comprise a computing device (e.g., a personal computer, laptop, smart phone, tablet, PDA, Bluetooth device, etc.) capable of communicating with the network. The merchant and/or payment provider can utilize a network computing device (e.g., a network server) capable of communicating with the network. It should be appreciated that each of the devices utilized by users, merchants, and payment providers can be implemented as computer system 400 in a manner as follows:

Computer system 400 includes a bus 402 or other communication mechanism for communicating information data, signals, and information between various components of computer system 400. Components include an input/output (I/O) component 404 that processes a user action, such as selecting keys from a keypad/keyboard, selecting one or more buttons or links, etc., and sends a corresponding signal to bus 402. I/O component 404 can also include an output component, such as a display 411 and a cursor control 413 (such as a keyboard, keypad, mouse, etc.). An optional audio input/output component 405 can also be included to allow a user to use voice for inputting information by converting audio signals. Audio I/O component 405 can allow the user to hear audio. A transceiver or network interface 406 transmits and receives signals between computer system 400 and other devices, such as a user device, a merchant server, or a payment provider server via network 460. In one embodiment, the transmission is wireless, although other transmission mediums and methods can also be suitable. A processor 412, which can be a micro-controller, digital signal processor (DSP), or other processing component, processes these various signals, such as for display on computer system 400 or transmission to other devices via a communication link 418. Processor 412 can also control transmission of information, such as cookies or IP addresses, to other devices.

Components of computer system 400 also include a system memory component 414 (e.g., RAM), a static storage component 416 (e.g., ROM), and/or a disk drive 417. Computer system 400 performs specific operations by processor 412 and other components by executing one or more sequences of instructions contained in system memory component 414. Logic can be encoded in a computer readable medium, which can refer to any medium that participates in providing instructions to processor 412 for execution. Such a medium can take many forms, including but not limited to, non-volatile media, volatile media, and transmission media. In various implementations, non-volatile media includes optical or magnetic disks, volatile media includes dynamic memory, such as system memory component 414, and transmission media includes coaxial cables, copper wire, and fiber optics, including wires that comprise bus 402. In one embodiment, the logic is encoded in non-transitory computer readable medium. In one example, transmission media can take the form of acoustic or light waves, such as those generated during radio wave, optical, and infrared data communications.

Some common forms of computer readable and executable media include, for example, floppy disk, flexible disk, hard disk, magnetic tape, any other magnetic medium, CD-ROM, any other optical medium, punch cards, paper tape, any other physical medium with patterns of holes, RAM, ROM, E2PROM, FLASH-EPROM, any other memory chip or cartridge, carrier wave, or any other medium from which a computer is adapted to read.

In various embodiments, execution of instruction sequences for practicing the invention can be perfoimed by a computer system. In various other embodiments, a plurality of computer systems coupled by a communication link (e.g., LAN, WLAN, PTSN, or various other wired or wireless networks) can perform instruction sequences to practice the invention in coordination with one another. Modules described herein can be embodied in one or more computer readable media or be in communication with one or more processors to execute or process the steps described herein.

A computer system can transmit and receive messages, data, information and instructions, including one or more programs (i.e., application code) through a communication link and a communication interface. Received program code can be executed by a processor as received and/or stored in a disk drive component or some other non-volatile storage component for execution.

Where applicable, various embodiments provided by the present disclosure can be implemented using hardware, software, or combinations of hardware and software. Also, where applicable, the various hardware components and/or software components set forth herein can be combined into composite components comprising software, hardware, and/or both without departing from the spirit of the present disclosure. Where applicable, the various hardware components and/or software components set forth herein can be separated into sub-components comprising software, hardware, or both without departing from the scope of the present disclosure. In addition, where applicable, it is contemplated that software components can be implemented as hardware components and vice-versa—for example, a virtual Secure Element (vSE) implementation or a logical hardware implementation.

Software, in accordance with the present disclosure, such as program code and/or data, can be stored on one or more computer readable and executable mediums. It is also contemplated that software identified herein can be implemented using one or more general purpose or specific purpose computers and/or computer systems, networked and/or otherwise. Where applicable, the ordering of various steps described herein can be changed, combined into composite steps, and/or separated into sub-steps to provide features described herein.

According to an embodiment, the instant disposable payment card 150 can be for a limited number of purchases or a limited money amount. The instant disposable payment card 150 can be for a limited time or good until a predetermined date or event (such as Christmas, for example). Thus, the instant disposable payment card 150 can be considered temporary or disposable. Also, according to an embodiment, the account for the instant disposable payment card 150 can be funded only after a purchase is made. Such funding can require user authorization. Therefore, the user is substantially less at risk if the instant disposable payment card 150 is lost or stolen.

Moreover, if the instant disposable payment card 150 is lost or stolen the finder or thief has little or no access to the user's money. The funds can be withdrawn from the instant disposable payment card account as soon as the user notices a loss of control over the card. The user's bank account, credit card account, or other source of funding the account of the instant disposable payment card 150 can be effectively isolated from the unauthorized or illegitimate activities of a fraudster or thief.

According to an embodiment, the instant disposable payment card 150, once activated, can be used in a fashion that is similar to the fashion in which a credit card, debit card, gift card, or payment provider card is used. According to an embodiment, the instant disposable payment card 150, once activated, can be used in a fashion that is the same as the fashion in which a credit card, debit card, gift card, or payment provider card is used. Thus, use of the instant disposable payment card 150 can be substantially identical to use of a credit card or the like.

A user can activate and carry a plurality of the instant disposable payment cards 150. Each of the instant disposable payment cards 150 can have a predetermined amount of funding or potential funding associated therewith. Each of the instant disposable payment cards 150 can have the same or a different amount of funding associated therewith. Each of the instant disposable payment cards 150 can be used in different stores. A plurality of the instant disposable payment cards 150 can be used in one store. The instant disposable payment cards 150 can have denominations or money amounts thereon, such as printed or embossed thereon. Thus, the instant disposable payment cards 150 can be used in a fashion similar to the use of cash. The instant disposable payment cards 150 can be used in higher risk places, such as bars, where the use of cash, credit cards, and checks is less desirable.

As used herein, the term "store" can include any business or place of business. The store can be a brick and mortar store or an online store. The store can be any person or entity that sells a product.

As used herein, the term "product" can include any item or service. Thus, the term "product" can refer to physical products, digital goods, services, or anything for which a user can make a payment, including charitable donations. A product can be anything that can be sold. Examples of products include cellular telephones, concerts, meals, hotel rooms, automotive repair, haircuts, digital music, and books. The product can be a single item or a plurality of items. For example, the product can be a tube of toothpaste, a box of laundry detergent, three shirts, and a donut.

As used herein, the term "merchant" can include any seller of products. The term merchant can include a store. The products can be sold from a store or in any other manner.

As used herein, the term "mobile device" can include any portable electronic device that can facilitate data communications, such as via a cellular network and/or the Internet. Examples of mobile devices include cellular telephones, smart phones, tablet computers, and laptop computers. The mobile device can be any device with which the instant disposable payment card can be scanned.

As used herein, the term "network" can include one or more local area networks (LANs) such as business networks, one or more wide area networks (WANs) such as the Internet, one or more cellular telephone networks, or any other type or combination of electronic or optical networks.

As used herein, the terms "card" and "payment card" can refer to any card or other device that can be used to make a purchase in place of cash. For example, the card can be a bank card, credit card, debit card, gift card, payment provider card, or other device. The card can be a token, such as a hardware token or a software token. The card can be stored in and/or displayed upon a user device, such as a cellular telephone. The card can be a virtual card.

As used herein, the term "scan" can refer to any process for determining a code or other information, such as from the instant disposable payment card. Thus, scanning can include reading or imaging a QR code, a bar code, an SKU, an NFC code, and RFID code, or any other code.

Although a QR code is referred to herein, such reference is by way of example only and not by way of limitation. A QR code, a bar code, an SKU, an NFC code, an RFID code, as well as any other code or combination of codes can be used.

As used herein, the term "instant" can refer to a short period of time. Thus, an instant disposable payment card can be a payment card that can be obtained and activated in a short period of time as compared to the amount of time that it takes to obtain and active a contemporary payment or credit card. For example, it can take days or weeks to obtain and activate a contemporary credit card, whereas it can take a few minutes to obtain and activate the instant disposable payment card discussed herein.

As used herein, the term "disposable" can refer to a payment card that can be used as much or as little as desired and can then be discarded. Thus, the instant disposable payment card can be used for one, two, three, four, five, or more purchases. Thus, the instant disposable payment card can be used for no purchases, for refundable deposits, for rental, or for any other purpose.

Activation, funding, fund withdrawal and deactivation can be done by the system automatically or by the user, such as by using the payment system provider facility. The card can also be deactivated and funds withdrawn when not the funds are needed or when the card is stolen or lost. Thus, the user's money and/or accounts can more safely be isolated from thieves and fraudsters.

The foregoing disclosure is not intended to limit the present invention to the precise forms or particular fields of use disclosed. It is contemplated that various alternate embodiments and/or modifications to the present invention, whether explicitly described or implied herein, are possible in light of the disclosure. Having thus described various example embodiments of the disclosure, persons of ordinary skill in the art will recognize that changes can be made in form and detail without departing from the scope of the invention. Thus, the invention is limited only by the claims.

What is claimed is:

1. A mobile device comprising:
an image capture component;
a GPS receiver configured to determine a location of the mobile device;
a wireless transceiver providing wireless communication for the mobile device;
a non-transitory memory; and
one or more hardware processors coupled to the non-transitory memory and configured to read instructions from the non-transitory memory to cause the mobile device to perform operations comprising:
in response to detecting a barcode disposed on an instant disposable payment card and captured by the image capture component, determining a pre-created instant disposable card account corresponding to the barcode;
determining a predetermined location corresponding to the instant disposable card account;
determining a location of the mobile device using the GPS receiver; and
in response to determining that the location of the mobile device is at or near the predetermined location, initiating communication directly with a payment service provider that causes:
activation of the instant disposable payment card for a transaction, and
causes funding of the instant disposable payment card by the payment service provider after the payment service provider receives indication that the transaction has been approved by a user of the mobile device and a merchant.

2. The mobile device of claim 1, wherein the operations further comprise communicating identification information of the user to the payment service provider for activating the instant disposable payment card.

3. The mobile device of claim 1, wherein the pre-created instant disposable card account is not funded until after a purchase is made using the instant disposable payment card.

4. The mobile device of claim 1, wherein the operations further comprise:

receiving communication from the payment service provider indicating that the pre-created instant disposable card account has been funded; and
displaying a message informing the user that the pre-created instant disposable card account is funded with a money amount.

5. The mobile device of claim 1, wherein the operations further comprise automatically funding the pre-created instant disposable card account via a payment provider.

6. The mobile device of claim 1, wherein the pre-created instant disposable card account is automatically provided with a credit amount.

7. The mobile device of claim 1, wherein the barcode comprises a quick response (QR) code.

8. The mobile device of claim 1, wherein payments made using the pre-created instant disposable card account are processed via Instant Automated Clearing House (iACH).

9. The mobile device of claim 1, wherein payments made using the pre-created instant disposable card account are processed via invoice funding.

10. The mobile device of claim 1, wherein the pre-created instant disposable card account is funded with an amount of a purchase after the purchase is made.

11. A method comprising:
detecting, by an image capture component of a mobile device, a barcode of an instant disposable payment card;
in response to detecting the barcode captured by the image capture component, determining, by the mobile device, a pre-created instant disposable card account corresponding to the barcode;
determining, by the mobile device, a predetermined location corresponding to the instant disposable card account;
determining a location of the mobile device using a GPS receiver of the mobile device; and
in response to determining that the location of the mobile device is at or near the predetermined location, initiating, by the mobile device, communication directly with a payment service provider that causes:
activation of the instant disposable payment card for a transaction, and
causes funding of the instant disposable payment card by the payment service provider after the payment service provider receives indication that the transaction has been approved by a user of the mobile device and a merchant.

12. The method of claim 11, further comprising communicating, by the mobile device, identification information of the user to the payment service provider for activating the instant disposable payment card.

13. The method of claim 11, wherein the pre-created instant disposable card account is not funded until after a purchase is made using the instant disposable payment card.

14. The method of claim 11, further comprising:
receiving, by the mobile device, communication from the payment service provider indicating that the pre-created instant disposable card account has been funded; and
displaying, by the mobile device, a message informing the user that the pre-created instant disposable card account is funded with a money amount.

15. The method of claim 11, wherein the pre-created instant disposable card account is automatically provided with a credit amount.

16. The method of claim 11, wherein the barcode comprises a quick response (QR) code.

17. The method of claim 11, wherein payments made using the pre-created instant disposable card account are processed via Instant Automated Clearing House (iACH).

18. The method of claim 11, wherein payments made using the pre-created instant disposable card account are processed via invoice funding.

19. The method of claim 11, wherein the pre-created instant disposable card account is funded with an amount of a purchase after the purchase is made.

20. A non-transitory machine-readable medium having stored thereon machine-readable instructions executable to cause a mobile device to perform operations comprising:

> detecting, by an image capture component of the mobile device, a barcode of an instant disposable payment card;
>
> in response to detecting the barcode captured by the image capture component, determining, by the mobile device, a pre-created instant disposable card account corresponding to the barcode;
>
> determining, by the mobile device, a predetermined location corresponding to the instant disposable card account;
>
> determining a location of the mobile device using a GPS receiver of the mobile device; and
>
> in response to determining that the location of the mobile device is at or near the predetermined location, initiating, by the mobile device, communication directly with a payment service provider that causes:
>
> > activation of the instant disposable payment card for a transaction, and
> >
> > causes funding of the instant disposable payment card by the payment service provider after the payment service provider receives indication that the transaction has been approved by a user of the mobile device and a merchant.

* * * * *